June 16, 1931.  F. A. STIRRUP  1,810,229
COUPLING AND MOUNTING MEMBER FOR FIXTURES AND THE LIKE
Filed April 7, 1928
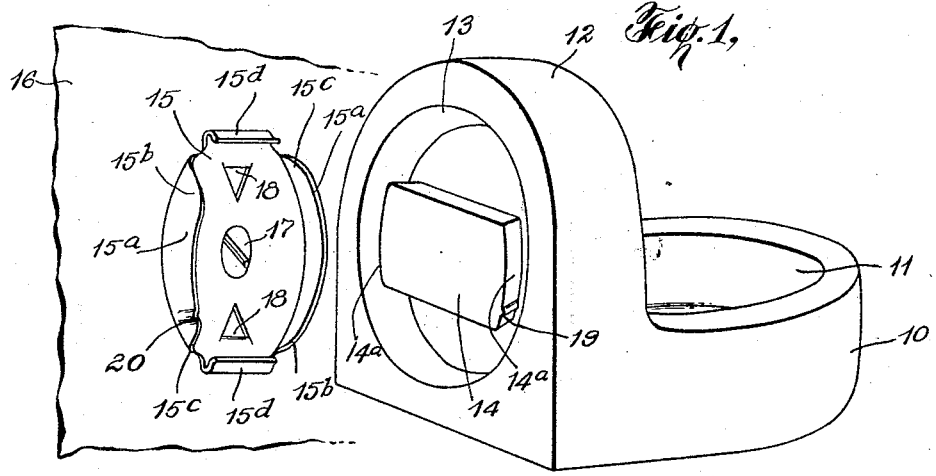
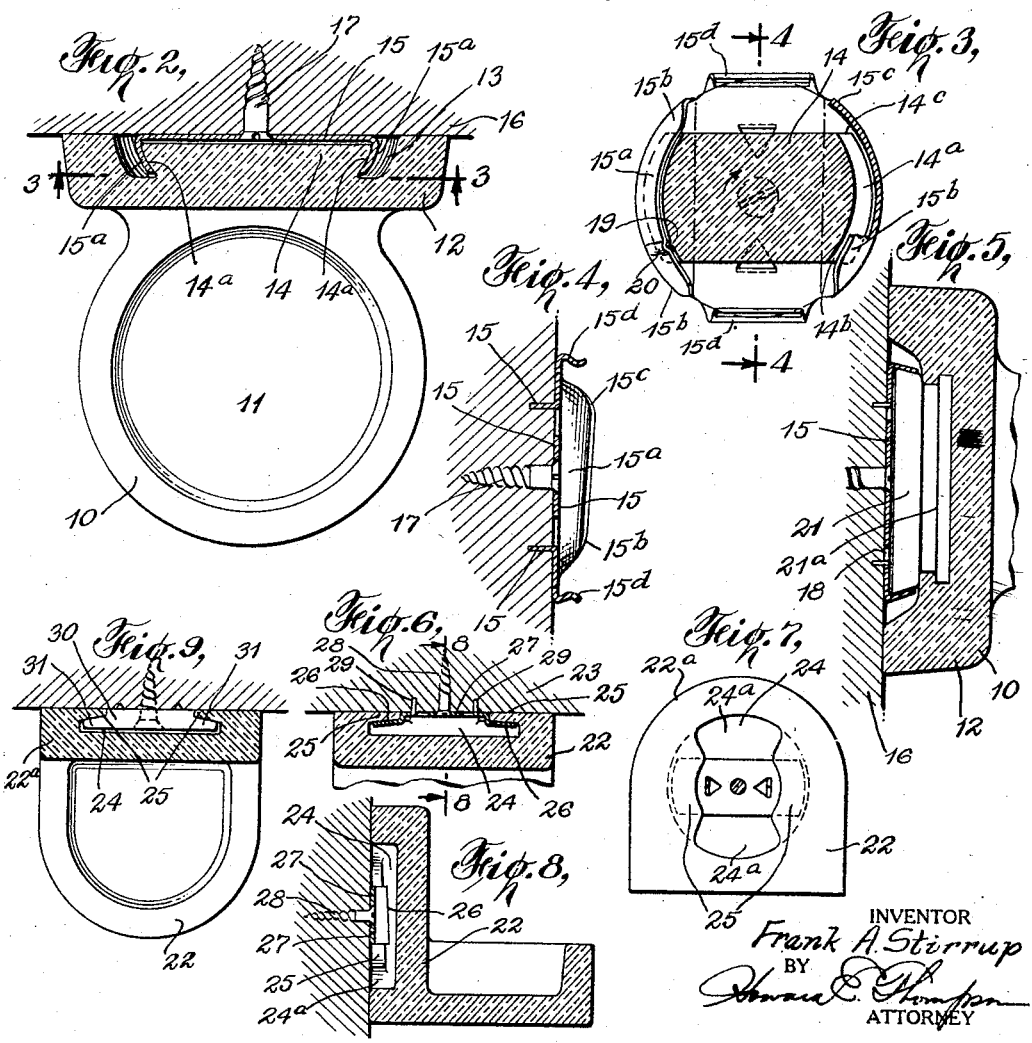
INVENTOR
Frank A. Stirrup
BY
ATTORNEY Patented June 16, 1931

1,810,229

UNITED STATES PATENT OFFICE

FRANK A. STIRRUP, OF WESTFIELD, NEW JERSEY

COUPLING AND MOUNTING MEMBER FOR FIXTURES AND THE LIKE

Application filed April 7, 1928. Serial No. 268,317.

This invention relates to improvements in means for coupling two or more body members together or for supporting one body member in connection with another; and the object of the invention is to provide a coupling or mounting means of the class specified which is invisible or concealed within the body members or parts coupled together thereby; a further object being to provide a coupling of the class described which is secured to or constitutes a part of the structure of the separate members or parts to be coupled, the interlocking or coupling portions involving cooperative cam surfaces which operate to securely bind and couple the parts together and to move the adjacent faces of the parts into close and binding contact; a still further object being to provide a coupling or mounting means of the class specified adapted for use in connection with fixtures of various kinds and classes, adapted to be supported in connection with a wall or other surface whereby the fixture may be coupled and uncoupled at will, for cleaning or other purposes; and with these and other objects in view, the invention consists in a device of the class and for the purpose specified which is simple in construction, efficient in use and which is constructed as hereinafter described and claimed.

The invention is fully disclosed in the following specification, of which the accompanying drawings form a part, in which the separate parts of my improvement are designated by suitable reference characters in each of the views, and in which:

Fig. 1 is a perspective view of two parts or members adapted to be coupled by my improved coupling means, shown detached.

Fig. 2 is a cross sectional view of the structure shown in Figs. 1 and 2 with the separate parts attached.

Fig. 3 is a partial section on the line 3—3 of Fig. 2 with part of the construction broken away.

Fig. 4 is a section on the line 4—4 of Fig. 3 omitting one of the parts shown in Fig. 3.

Fig. 5 is a view similar to Fig. 2 but showing a modification.

Fig. 6 is a view similar to Figs. 2 and 5 but showing another modification.

Fig. 7 is a face view of a part of the structure shown in Fig. 6.

Fig. 8 is a section on the line 8—8 of Fig. 6; and,

Fig. 9 is a view similar to Fig. 6 but showing a modification.

My invention relates to a means for coupling two or more parts or body members together or for mounting one body member in connection with a suitable support, such for example as the mounting of a fixture in connection with a wall or other surface, the particular type of fixture illustrated to show one use of my invention, being in the form of a dish or receptacle, but may be of any desired form and construction.

In Fig. 1 of the drawings, 10 represents a dish comprising a cup-shaped bottom portion 11 and a back member 12, the dish being made of china, porcelain, glass or similar material, but may be constructed of metal or other molded or stamped bodies.

In the construction shown, the body or part 10 or the back member 12 thereof is provided with a substantially circular recess 13 on its inner face, and within said recess is arranged a transverse coupling member 14 made integral with the structure of the part 10. The end walls 14a of said member are arc-shaped in form and are in spaced relation to the side walls of the recess 13 and are cam-shaped in form and beveled outwardly, the bevels at the sides 14b being of a greater pitch than at the sides 14c, note Fig. 3 of the drawing.

I also employ another coupling member 15 in the form of a sheet metal disk having oppositely disposed cam flanges 15a inclined inwardly toward the axis of the disk to correspond to the beveled surfaces of the walls 14a of the member 14. These flanges set inwardly to a greater extent at the ends 15b than at the ends 15c thereof to provide a firm and positive engagement of the entire surfaces of the walls 14a with the inner faces of the flanges 15a when the members 14 and 15 are coupled together, said members being securely locked together by the cam or wedgelike action between the cooperating surfaces of said walls and flanges, as will be apparent.

Arranged at right angles to the flanges 15a are other spring flanges 15b over which the end walls 14a of the member 14 pass in mounting the part 10 in connection with the wall or other support 16, to which support the plate 15 is secured by a screw 17 passed through an aperture in the central part of the plate 15.

The plate 15 is locked against rotation by prongs or the like 18 cut from the material of said plate. While these prongs have been shown as being comparatively large, they may in fact constitute very small members or projections, and these prongs will also aid in guiding the operator, in securing the plate 15 to a support 16 to properly set or aline the part 10 thereon to bring the cup-shaped portion 11 in horizontal position.

It is also preferred that at least one of the walls 14a of the member 14 be provided with a projecting bead 19 adapted to engage a corresponding recess 20 in one of the flanges 15a to tensionally lock the part 10 in proper position upon the support 16, but this locking structure is not absolutely essential as the interengaging surfaces of the members 14 and 15 will operate to securely hold and bind the part 10 upon the support, it being understood that the inner face of the back member 12 is moved into firm engagement with the outer surface of the support 16 as clearly seen in Fig. 2 of the drawings.

It will also be understood that the spring members 15d are not absolutely necessary and in mounting the part 10 in position, it will be understood that this part is moved into a position at right angles to that shown in Fig. 1, with the walls 14a in alinement with the flanges 15d. Said part is then rotated to bring the member 14 in substantially horizontal postion or with the bottom face of the cup-shaped portion 11 in proper horizontal position and alinement with reference to the support 16.

In Fig. 5 of the drawings, I have shown a slight modification of the structures shown in Figs. 1 to 4 inclusive wherein the part 10 or the back member 12 thereof is provided with a member 21, in all respects similar in cross sectional form to the projecting member 14, but is made of a material different from that employed in the part 10 and is anchored thereto by a portion 21a imbedded from back member 12 of said part, for example, the member 21 may constitute a metal body which is secured in position in the mold of the part 10. In this construction, the coupling member 15 is the same as that shown in Figs. 1 to 4 inclusive, but in this figure, the prongs 18 are shown considerably smaller and located in a different position with reference to the location of the prongs in said other figures. Aside from the foregoing, the manner of attachment and coupling of the part 10 with the support 16, will be identical with the structure shown in the other figures.

In Figs. 6 to 8 inclusive, I have shown a modification which consists in reversing the structure to such a degree as to form in the part to be mounted in connection with a support, simply a socket having wall members adapted to be engaged by a projecting part arranged on the support. In these figures 22 represents the part to be mounted in connection with a support 23, the part 22 being substantially of the same general form as the part 10 shown in the other figures except that the back member 22a of the part 22 is provided with a recess or chamber 24 having inwardly and radially projecting wall members 25, the inner surfaces of which are beveled and cam-shaped in form to engage beveled and cam-shaped flanges 26 on a coupling member 27 secured to the support 23 by a screw 28 and keyed against rotation by prongs 29.

The member 27 in the construction shown in said figures, is stamped from sheet metal. In mounting the part 22 in connection with the support 23, the flanges 26 pass through the openings 24a arranged between the walls 25, and the part 22 is rotated to bring the flanges into firm engagement with the inner beveled surfaces of the walls 25 and operates to move the inner face of the back member 22a of the part 22 into firm engagement with the outer face of the support 23.

The cooperating surfaces of the walls 25 and flanges 26 are substantially identical to that of the engagement of the walls 14a with the flanges 15a. By constructing the part 22 in the manner shown in Figs. 6 to 8 inclusive, the necessity of forming the member 14 integral with the part 10 or securing the member 21 thereto is obviated. It will also be understood that instead of using a sheet metal coupling member 27 as in Figs. 6 to 8 inclusive, a heavier metallic coupling member 30 may be employed, having flanged ends 31 engaging the cam-shaped walls 25 projecting into the recess or chamber 24 in the back wall 22a of the part 22 in the manner seen in Fig. 9 of the drawings. The beveled or cam-shaped surfaces of the inner faces of the walls 25 may be seen upon an examination of Fig. 8 of the drawings wherein one of said walls is shown and the flange 26 of the coupling 27 engaging said wall when the parts are in coupled relation.

It will be understood from the foregoing that my invention is not necessarily limited to the specific structure of the coupling means employed in mounting one body part in connection with the other.

It will also be understood that while I have illustrated my invention as particularly relating to the mounting of a fixture in connection with a wall or other surface, that my invention may be used in coupling two parts or body members of any kind or class together, one member of the coupling being arranged on one part or body and the other on the other part or body, the coupling members consisting of cooperating beveled surfaces with means for permitting of the engagement and disengagement of said surfaces in coupling the parts together.

Various other changes in and modifications of the construction herein shown and described may be made within the scope of the appended claims without departing from the spirit of my invention or sacrificing its advantages.

Having fully described my invention, what I claim as new and desire to secure by Letters Patent, is:

1. In a fixture of the class described, the back wall of which is provided with a comparatively large recess, the boundary wall of which is circular in form, a bar-like coupling member arranged centrally of and within the recessed portion of the fixture, the ends of said coupling member terminating short of the boundary wall of said recess and being eccentric with respect to said wall forming cam surfaces facilitating the coupling of the fixture with a suitable support and a supporting part comprising a disk adapted to be secured to a suitable support, the periphery of said disk being provided on opposite side edges with outwardly extending curved flanges adapted to cooperate with the end walls of said coupling member in securing the fixture to said support, the support of said disk comprising a central screw and prong members spaced circumferentially with reference to said screw for rotatably adjusting the plate on said support.

2. In a fixture of the class described, the back wall of which is provided with a comparatively large recess, the boundary wall of which is circular in form, a bar-like coupling member arranged centrally of and within the recessed portion of the fixture, the ends of said coupling member terminating short of the boundary wall of said recess and being eccentric with respect to said wall, forming cam surfaces facilitating the coupling of the fixture with a suitable support, and a supporting part comprising a disk adapted to be secured to a suitable support, the periphery of said disk being provided on opposite side edges with outwardly extending curved flanges adapted to cooperate with the end walls of said coupling member in securing the fixture to said support, and said plate having oppositely disposed springs adapted to engage the boundary wall of the recess in said fixture to reinforce the mounting of the fixture in connection with the support.

3. In a fixture of the class described, the back wall of which is provided with a large circular recess and a coupling member arranged within said recess and having beveled end walls and a supporting plate comprising a disk, means arranged centrally and axially of said disk for supporting the same in connection with a suitable support and permitting the rotatable adjustment of said disk to properly aline the fixture on said support, and said plate having oppositely arranged and beveled flanges projecting outwardly and adapted to be arranged from the plate and adapted to be arranged in the recess of the fixture and to cooperate with the beveled walls of the coupling member therein to secure the fixture in connection with the support to which said plate is secured.

4. In a fixture of the class described, the back wall of which is provided with a large circular recess and a coupling member arranged within said recess and having beveled end walls and a supporting plate comprising a disk, means arranged centrally and axially of said disk for supporting the same in connection with a suitable support and permitting the rotatable adjustment of said disk to properly aline the fixture on said support, said plate having oppositely arranged and beveled flanges projecting outwardly from the plate and adapted to be arranged in the recess of the fixture and to cooperate with the beveled walls of the coupling member therein to secure the fixture in connection with the support to which said plate is secured, and the cooperating surfaces of said coupling member and plate being such as to draw adjacent surfaces of the fixture and support into firm engagement.

5. In a fixture of the class described, the back wall of which is provided with a large circular recess and a coupling member arranged within said recess and having beveled end walls and a supporting plate comprising a disk, means arranged centrally and axially of said disk for supporting the same in connection with a suitable support and permitting the rotatable adjustment of said disk to properly aline the fixture on said support, said plate having oppositely arranged and beveled flanges projecting outwardly from the plate and adapted to be arranged in the recess of the fixture and to cooperate with the beveled walls of the coupling member therein to secure the fixture in connection with the support to which said plate is secured, the cooperating surfaces of said coupling member and plate being such as to draw adjacent surfaces of the fixture and support into firm engagement, and said plate including outwardly extending spring members cooperating with the walls of said recess to aid in supporting said fixture.

6. A fixture of the class described, the back wall of which is provided with a comparatively large recess, a bar-like coupling member arranged within said recess and having end walls in spaced relation to the boundary walls of the recess, means involving a bracket for securing the fixture to a suitable support, said bracket having parts extending into the recess of the fixture at opposite sides of said bar-like coupling and moved into engagement with the end walls of said coupling by the rotation of said fixture with reference to said support and bracket, and said bar-like coupling constituting a body imbedded in and anchored to the fixture.

7. A fixture of the class described, the back wall of which is provided with a comparatively large recess, a bar-like coupling member arranged within said recess and having end walls in spaced relation to the boundary walls of the recess, means involving a bracket for securing the fixture to a suitable support, said bracket having parts extending into the recess of the fixture at opposite sides of said bar-like coupling and moved into engagement with the end walls of said coupling by the rotation of said fixture with reference to said support and bracket and said bracket including spring members cooperating with the fixture at points at right angles to the end walls of said bar-like coupling.

8. In a fixture of the class described, the back wall of which is provided with a comparatively large recess, the boundary wall of which is circular in form, a bar-like coupling member arranged centrally of and within the recessed porton of the fixture, the end walls of said coupling member being comparatively wide and terminating short of the boundary wall of said recess, and said end walls being eccentric with respect to the wall of said recess to form cam surfaces facilitating the coupling of the fixture with a suitable support.

9. In a fixture of the class described, the back wall of which is provided with a comparatively large recess, the boundary wall of which is circular in form, a bar-like coupling member arranged centrally of and within the recessed portion of the fixture, the end walls of said coupling member being comparatively wide and terminating short of the boundary wall of said recess, said end walls being eccentric with respect to the wall of said recess to form cam surfaces facilitating the coupling of the fixture with a suitable support, and a supporting part comprising a disk adapted to be secured to a suitable support and the periphery of said disk being provided on opposite side edges with inwardly extending curved flanges adapted to cooperate with the eccentric end walls of said coupling member in securing the fixture to said support.

In testimony that I claim the foregoing as my invention I have signed my name this 4th day of April, 1928.

FRANK A. STIRRUP.